United States Patent Office 3,186,920
Patented June 1, 1965

3,186,920
PROCESS FOR PREPARING A STREPTOKINASE
Norbert Heimburger, Cappel, near Marburg (Lahn), Rudolf Schmidtberger, Marbach, near Marburg (Lahn), and Gerhard Schwick, Marburg (Lahn), Germany, assignors to Behringwerke Aktiengesellschaft, Marburg (Lahn), Germany, a corporation of Germany
No Drawing. Filed Feb. 7, 1963, Ser. No. 256,808
Claims priority, application Germany, Oct. 17, 1962, B 69,264
5 Claims. (Cl. 195—66)

The present invention provides a process for preparing an immunologically uniform streptokinase under sterile conditions with carboxymethyl-polysaccharides.

Streptokinase, a biocatalyst which has proved highly active in the therapy of veinous and arterial diseases such as thromboses, thrombophlebitides and pulmonary embolisms, are produced by streptococci. A strain of streptococci apathogenic to humans is used for producing streptokinase. In addition to streptokinase, the streptococci also form other metabolites, for example, streptodornase, streptolysin, hyaluronidase, and diphosphopyridine-nucleotidase during their growth.

For preparing a streptokinase of high potency, it is necessary to convert the crude streptokinase into a highly pure streptokinase by appropriate purification measures. However, the purification must be carried out under sterile conditions to ensure that the streptokinase be tolerated intravenously. Hence it is of importance to prevent contamination of the streptokinase by pyrogenic substances, i.e. substances which cause fever. In addition to good tolerance on intravenous injection, the isolated product should also have a high potency.

Now, we have found a process for preparing an immunologically uniform streptokinase under steril conditions, wherein a streptokinase-containing aqueous buffer solution obtained from a streptococci filtrate and having a molarity of 0.01 M and a pH-value of 5.0, preferably a sodium citrate buffer, is adsorbed on a carboxymethyl-polysaccharide which has been heated twice for 3 hours to 60° C., the interval between these heating periods being two hours, unspecific proteins that are still in solution are eliminated, the main fraction of streptokinase is eluted with a 0.02 molar buffer solution having a pH-value of 5.5, preferably a sodium citrate buffer solution, and the residual fraction of streptokinase is eluted from the carboxymethyl-polysaccharide with a 0.1 molar buffer solution having a pH-value of 6.5, preferably a sodium citrate buffer solution.

The process is carried out according to the following scheme:

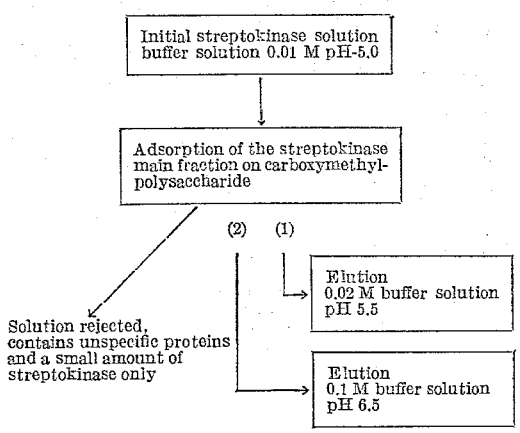

The process of the present invention may be carried out in a column, for example, in a pressure filter having the form of a column, or according to the batch process. In general, pressure filters consist of a cylindrical tube the upper third of which is conical and whose base plate is the filter. With such pressure filters the liquids are filtered at an excess pressure to prevent evaporation.

In the process of the present invention, there may be used suitably a commercial filter, for example, one having a capacity of 240 cc., a height of 100 mm., a plate diameter of 60 mm. and a discharge pipe with a diameter of about 11 mm.

As adsorbing agents, there may be used carboxymethyl-polysaccharides, for example, carboxymethylcellulose or cross-linked dextran etherified with carboxymethyl groups.

A special advantage of the process of the invention is that it may be carried out within the short period of 4–5 hours and thus even at room temperature. An immunologically uniform streptokinase is obtained which is suitable for intravenous application and which is free from streptodornase, streptolysin, hyaluronidase, and diphosphopyridinenucleotidase.

It is advantageous to start from a streptokinase which has been purified in known manner, for example, by alcohol and ammonium sulfate precipitation. After application of the process of the present invention, there is then obtained a streptokinase having almost 800 units/gamma N. The potency is expressed in Christensen units.

The immunological uniformity of the streptokinase obtained according to the present invention is proved by immuno-electrophoresis and by the Ouchterlony test.

The following examples illustrate the invention, but they are not intended to limit it thereto:

Example 1

A pressure filter having a capacity of 240 cc. was filled up to two thirds of its volume with a carboxymethylcellulose which had been treated twice for 3 hours each at 60° C., with an interval of two hours, and which had been "equilibrated," i.e. rinsed with a 0.01 molar citrate buffer having a pH-value of 5.0 until the eluate showed a pH-value and a specific conductivity similar to that of the buffer (1.45 M S/cm.).

The column prepared in this manner was then charged with 60 cc. of a concentrate of a streptococci filtrate in a 0.01 molar sodium citrate buffer solution containing about 1% of protein, thus 37 million units of streptokinase per 60 cc. of solution and 385 units of streptokinase per gamma N, rinsed with a 0.01 molar citrate buffer having a pH-value of 5.0, until spectrometric tests showed the rinsing liquid to contain no more proteins. The rinsing liquid contained the main quantity of unspecific proteins and in addition thereto 2.2 million units of streptokinase (5.9% of the quantity of streptokinase initially used).

The adsorbed streptokinase was then eluted in two stages; first with 650 cc. of a 0.02 molar citrate buffer having a pH-value of 5.5, wherefrom 15 million units=40.5% (730 units per gamma N) were obtained, and eventually with 400 cc. of a 0.1 molar citrate buffer having a pH-value of 6.5, wherefrom 7.8 million units=21% (590 units per gamma N) were obtained. Thus, from the total of 67.4% streptokinase recovered, 61.5% were contained in these two streptokinase fractions. 40.5% of the recovered streptokinase showed approximately double the potency of the starting material. Immuno-electrophoresis and the Ouchterlony test proved the product to be uniform.

Example 2

To 500 mg. of a crude streptokinase which had been purified by alcohol fractionation and which showed a biological activity of 350 units per gamma N, dissolved in a 0.01 molar sodium citrate buffer having a pH-value of 5.0, were added 50 g. of a carboxymethylcellulose which had been "equilibrated" with the same buffer and heated for 6 hours to 60° C.; the whole was then stirred mechanically for one hour at room temperature. The carboxymethyl-cellulose/streptokinase complex was then separated from the solution by centrifugation and washed with 250 cc. of the 0.01 molar sodium citrate buffer having a pH-value of 5.0. There followed a first elution of the adsorbed streptokinase with 2×200 cc. of a 0.02 molar sodium citrate buffer having a pH-value of 5.5 and subsequently a second elution with 2×200 cc. of a 0.1 molar sodium citrate buffer having a pH-value of 6.5.

The two eluates which contained the desorbed streptokinase were then separated from the carboxymethylcellulose by centrifugation. The streptokinase content of both solutions was determined; the following values were obtained:

|  | Yield |
|---|---|
| (1) 12 million with 790 units per gamma N | 43%. |
| (2) 7.3 million with 630 units per gamma N | 26%. |
|  | 69% of the starting product. |

From the 19.3 million units of streptokinase recovered, 62% proved uniform on immuno-electrophoresis and in the Ouchterlony test. The remaining 38% showed in the Ouchterlony test a slight amount of another protein. This component could be eliminated to a great extent by repeating the adsorption and elution of the product as described above.

*Example 3*

100 cc. of a 0.5% protein solution obtained by ultrafiltration from a streptococci filtrate, which thus contained 40,000 units per cc., i.e. a total of 40 million units of streptokinase and 50 units per gamma N, were purified on carboxymethylcellulose as described in Examples 1 and 2. There were obtained:

The first batch containing 6 million units (16 units per gamma N) thus 15% of the initial content of non-adsorbed streptokinase and unspecific proteins;
The principal fraction as the first eluate of the streptokinase adsorption product, containing 17 million units (610 units per gamma N), thus 42.5% of the initial content of streptokinase;
The final batch as the second eluate containing 9 million units (400 units per gamma N), thus 22.5% of the initial streptokinase content.

The principal fraction thus contained a product which was 12 times as pure as the starting product.

*Example 4*

6 cc. of a 1% streptokinase solution purified with ammonium sulfate and alcohol and containing 700,000 units per cc. and 435 units per gamma N, were purified as described in Example 1, but on a cross-linked dextran etherified with carboxymethyl groups. The adsorbing agent was contained in a glass tube of 20 cm. length and a diameter of 1.9 cm., the lower part of the tube, i.e. 2 cm., being conical to a diameter of 0.4 cm.
There were obtained:

The first batch containing 0.8 million units (7 units per gamma N), thus 19% of the initial content of non-adsorbed streptokinase and unspecific proteins;
The principal fraction as the first eluate of the streptokinase adsorption product, containing 1.64 million units (720 units per gamma N), thus 39% of the initial streptokinase content;
The final batch as the second eluate containing 0.93 million units (500 units per gamma N), thus 22% of the initial streptokinase content.

Thus, the starting material which already contained 435 units per gamma N was purified to 1½ times of its biological activity.

We claim:
1. The process for preparing an immunologically uniform streptokinase under sterile conditions, wherein a streptokinase-containing aqueous buffer solution obtained from a streptococci filtrate and having a molarity of 0.01 and a pH-value of 5.0, is adsorbed on a carboxymethyl-polysaccharide selected from the group consisting of carboxymethylcellulose and cross-linked dextran etherified with carboxymethyl groups, which has been heated twice for 3 hours each to 60° C., with an interval of two hours, unspecific proteins that are still in solution are eliminated, the principal fraction of streptokinase is eluted from the carboxymethyl-polysaccharide with a 0.02 molar buffer solution having a pH-value of 5.5 and the residual fraction of streptokinase is eluted with a 0.1 molar buffer solution having a pH-value of 6.5.

2. The process as claimed in claim 1, wherein the process is started from a streptokinase purified in known manner, for example, by alcohol and ammonium sulfate precipitation.

3. The process as claimed in claim 1, wherein carboxymethylcellulose is used as carboxymethyl-polysaccharide for adsorbing the streptokinase.

4. The process as claimed in claim 1, wherein cross-linked dextran etherified with carboxymethyl groups is used as carboxymethyl-polysaccharide for adsorbing the streptokinase.

5. The process as claimed in claim 1, wherein an aqueous sodium citrate solution is used as buffer solution.

References Cited by the Examiner
UNITED STATES PATENTS

| 3,042,586 | 7/62 | Siegel et al. | 195—66 |
| 3,042,667 | 7/62 | Flodin et al. | 260—209 |
| 3,107,203 | 10/63 | Baumgarten et al. | 195—66 |

OTHER REFERENCES

Flodin et al.: Nature, 188, 493–494 (November 5, 1960), Photo-Copy 167 Dex. (Available in Patent Office Science Library.)

Porath et al.: Nature 191, 69–70 (July 1, 1961), Photo-Copy 167 Dex. (Available in the Patent Office Science Library.)

A. LOUIS MONACELL, *Primary Examiner.*

NORMAN G. TORCHIN, *Examiner.*